Nov. 5, 1963   V. MASTIS   3,109,443
MOISTURE EJECTOR VALVE
Filed Sept. 8, 1958
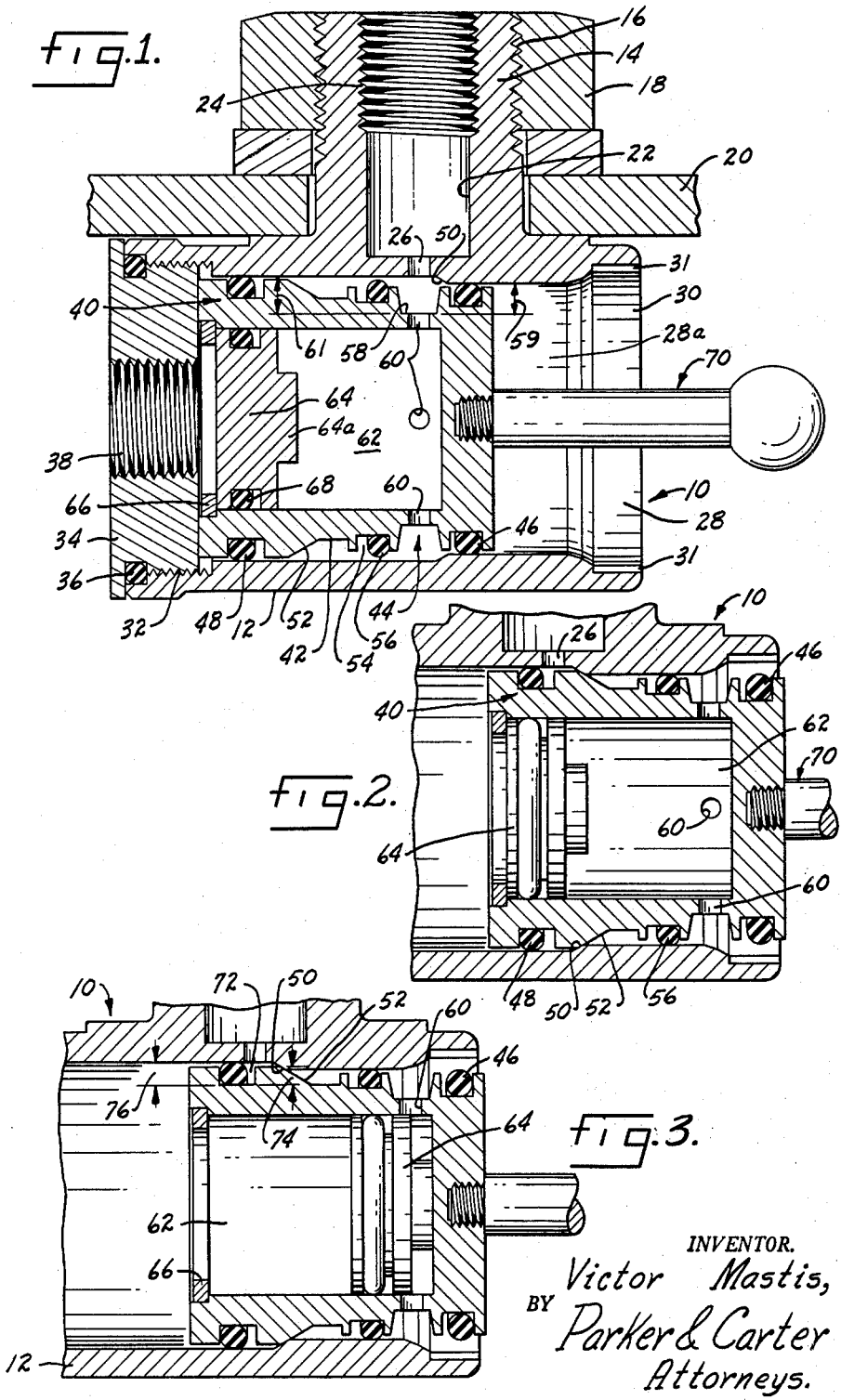
INVENTOR.
Victor Mastis,
BY Parker & Carter
Attorneys.

United States Patent Office 3,109,443
Patented Nov. 5, 1963

3,109,443
MOISTURE EJECTOR VALVE
Victor Mastis, Chicago, Ill., assignor to Berg Airlectro Products Co., Chicago, Ill., a corporation of Illinois
Filed Sept. 8, 1958, Ser. No. 759,462
8 Claims. (Cl. 137—204)

This invention resides in the field of moisture ejection valves and has particular application, for example, in relation to air brake systems used on large motor trucks. One purpose of the invention is to provide an automatic ejector valve of maximum simplicity and reliability.

Another purpose of the invention is to provide a moisture ejection valve effective to preclude, throughout its operation, exposure to atmosphere, through the valve, of an air brake system with which it is employed.

Another purpose is to provide a valve which ejects moisture from the air reservoir of a motor truck air brake system upon the application of the brake pedal or other device operated by air pressure.

Another purpose is to provide a valve for ejecting moisture which may be either automatically or manually operated.

Another purpose is to provide a moisture ejection valve which is light, durable, compact and capable of use in the air brake system of a large motor truck.

Another purpose is to provide a moisture ejection valve which may be operated by air pressure alone.

Another purpose is to provide a valve operable in any position for ejecting moisture from an air reservoir of a large motor truck air brake system.

Another purpose is to provide a moisture ejector device capable of employment with a pressure container and effective to employ the pressure within such container in the course of its operation.

Other purposes will appear in the ensuing specification and claims.

The invention is illustrated, more or less diagrammatically in the accompanying drawings, wherein:

FIGURE 1 is a sectional side view of a moisture ejection valve,

FIGURE 2 is a partial sectional side view of the moisture ejection valve of FIGURE 1, wherein the main piston is in ejecting position, and FIGURE 3 is a partial sectional side view of the moisture ejection valve of FIGURE 1 wherein the ejector piston has been moved to the ejecting position.

Referring now to the drawings, wherein like parts are indicated by like numerals, a housing or the like indicated generally at 10 includes a cylindrical body portion 12 and a cylindrical coupling extension 14 extending outwardly from the body portion. The outer periphery of the coupling extension is threaded as at 16 so that the housing may be secured by a suitable nut 18 to a frame such as shown at 20.

The coupling extension 14 has a generally central bore 22, the upper portion of which is threaded as at 24 so that the ejector valve may be connected by a suitable hose to the air reservoir of a large motor truck.

The bottom of the coupling extension has a generally central port 26 which connects the bore 22 with a cylindrical main chamber 28 in the body portion 12. The main chamber 28 is open to the atmosphere at the forward end 30 so that the moisture from the air reservoir may be ejected. The forward end 30 has a plurality of grooves 31 formed in the chamber wall through which the moisture is ejected. Four such grooves are shown in the drawings, but the number of grooves is not essential to the invention.

The end of the body portion 12 disposed away from the opening 30 has been threaded as at 32 so that a valve cover indicated at 34 may be secured to the body portion of the ejector valve. An O-ring 36 provides a seal between the body portion and the valve cover 34. The cover 34 has a generally central threaded bore 38 which opens into the main chamber 28 and is adapted to be connected into a source of fluid pressure such as the air brake system of a motor truck so that air under pressure can be admitted into the main chamber 28 through the bore 38 when the brake pedal or any other device delivering fluid pressure is operated. It should be noted that the air pressure applied through the bore 38 is less or equal to the pressure in the air reservoir.

A main piston assembly indicated generally at 40, mounted within the main chamber 28, has its side inwardly recessed at 42 so as to form an irregular space, indicated generally at 44, between the main piston and the body portion 12. As shown in FIGURE 1, the space 44 is in communication with the air reservoir through the port 26 and the central bore 22, the air pressure in the space 44 being equal to that of the air reservoir.

The forward end of the piston 40, as shown in FIGURE 1, has an O-ring 46 which provides a seal between the piston 40 and the body portion 12 so that the air reservoir is sealed from the atmospheric opening 30. The rearward portion of the main piston 40 has an O-ring seal 48 which provides a seal between the body portion 12 and the piston 40, sealing the air reservoir from the air system which is connected to the valve through the port or bore 38. This is shown more particularly in FIGURES 2 and 3. The main chamber 28 has a reduced chamber portion 28a bounded at its inner end by an inwardly extending annular lip which is adapted to stop the travel of the main piston 40 after it has traveled a predetermined distance.

Referring now to the construction of the main piston 40, the inward recession 42 has a generally slanted annular face 52 at its rearward end, which face cooperates with the annular lip 50 to stop the piston travel. Slightly forward of the slanted face 52 is an annular slot 54 which has an O-ring 56 placed therein. As shown in FIGURE 1, the O-ring 56 is loosely held in the slot 54 and is not providing a seal between the body portion and the piston, whereas in FIGURES 2 and 3, the O-ring 56 takes the place of the O-ring 46 and provides a seal between the reduced chamber portion 28a in body portion 12 and piston 40. Forward of the loosely held O-ring 56, the main piston 40 is even further inwardly recessed as at 58, and there is a plurality of ports 60 through which the space 44 may be connected with a second chamber 62 in the main piston 40. In the drawings there are four ports 60, each generally aligned with the grooves 31, so that the moisture in the chamber 62 may be ejected to the atmosphere through the ports and the grooves. Although the number of ports and grooves is not essential to the invention, there will normally be the same number of each.

At the rearward end of the second cylindrical chamber 62 is an ejector piston 64 which is held in the chamber 62 by a suitable split ring or the like 66. An O-ring 68 provides a seal between the main piston 40 and the inner piston or ejector piston 64 and prevents any air pressure from leaking out from the inner chamber 62 through the bore 38.

In normal usage, the chamber 62 will collect and hold the moisture from the air reservoir. The moisture will drip or flow down through the port 26, through the port 60, and into the chamber 62.

A manual release handle indicated generally at 70 may be inserted into the front of the main piston 40 so that the ejector valve may when desired be operated, at least in part, by hand.

The use, operation and function of my invention is as follows:

In the normal usage of fluid pressure systems, such as an air brake system in a large motor truck for example, moisture accumulates. To maintain such systems in good operating condition it is necessary to remove moisture therefrom. It is highly desirable that while removing the moisture from an air brake system for example, that the air pressure supply never become open or vented to atmosphere so as to cause a reduction in air pressure. If the supply were to be left open for any length of time the air pressure would be reduced to a point where the brakes would not function. Ejector valves operate rapidly and some have been provided with means limiting their "open" periods to fractional seconds, but each of these are subject to "sticking" in open position, thus venting the pressure supply. In the present invention, moisture is ejected and the air supply is never open to the atmosphere, thus positively precluding loss from any venting or sticking in vented position.

Another important advantage of the present invention is that it is operable completely by the air pressure system itself. There are no springs or similar means used to accomplish the function of the valve of this invention. A moisture ejection valve constructed in accordance with this invention is operated by pressure differentials created within the moisture ejection valve itself.

In FIGURE 1, the moisture ejection valve is shown in its non-ejecting or normal position so that the moisture may be collected in the second chamber 62 and bottom space 44. The moisture runs from the air reservoir, which is connected to the coupling extension 14, through the generally central bore 22, the port 26, and into the chamber 62 through the ports 60. The main piston or shuttle member 40 is held in its normal position by means of differential pressures created within the space 44.

In the forward direction, the air under preessure in the space 44 operates on a piston area indicated by the radial distance 59, while in the rearward direction the air pressure operates on a piston area indicated by the radial distance 61. As the radial distance 61 is greater than the radial distance 59 and the pressure throughout the space 44 is the same, the axial component of force on the rearward area is greater than the axial component of force on the forward area. This causes the piston to stay in the position shown in FIGURE 1.

The pressure within the chamber 62, which is equal to the pressure in the air reservoir and the pressure in the span 44, causes the second piston 64 to stay in the position of FIGURE 1, the piston being firmly held against the split ring 66.

When it is desired to eject or expel the moisture from the chamber 62 the truck operator may operate any device on the truck which is operated by air pressure. When this is done, a blast of air under pressure will be sent through the port 38 against the piston assembly 40. The pressure of the air from the port 38 is less than or equal to the pressure in the chamber 62, so the piston 64 cannot move. However the pressure of the air coming through the port 38 is enough to overcome the pressure differentials created within the recession 44. Therefore, the main piston 40 is moved towards the opening 30 and comes to rest in the position of FIGURE 2, with the slanting faces 50 and 52 of the body portion and main piston respectively cooperating to stop the piston. The air reservoir is still sealed off from the atmosphere as the O-ring 56 now seals the main piston to the body portion 12, whereas before the O-ring 46 sealed the reservoir from the atmosphere.

The ports 60 which connect the chamber 62 to the outside of the main piston 40 are now open to the atmosphere through the grooves 31 which are generally aligned with the ports 60. As the pressure in the chamber 62 is now reduced by the ports 60 being open to the atmosphere, the air pressure coming through the port 38 will move the piston 64 forward in the chamber 62 forcing the moisture out of the chamber and into the atmosphere. The piston 64 will continue its forward movement until all the moisture is forced out and the piston is in the position of FIGURE 3. The air reservoir is still sealed from the atmosphere and from the port 38, the O-ring 56 forming a seal between the forward part of the piston and the main body portion 12, and the O-ring 48 forming a seal between the rearward part of the piston and the main body portion.

After all the water has been expelled from the chamber 62 and both pistons are in the position shown in FIGURE 3, the pistons are automatically returned to the position of FIGURE 1 as follows:

The air under pressure from the reservoir coming into space 72 between the piston and the housing in FIGURE 3, can operate in the forward direction on a piston area indicated by the radial distance 74, and in the rearward direction by a larger area indicated by the radial distance 76. As the air pressure is the same throughout the space 72, the greater axial component of force will be on the rearward area and the piston will move toward the position of FIGURE 1. As the piston moves rearwardly, it comes to a point where the port 26 once again opens into the space 44, which causes air under pressure to be introduced into the space 44. The same differential pressures which hold the piston in its normal position, now operate to move it toward this position. As soon as the air under pressure starts to come through the port 26 into the space 44 it also will come in to the chamber 62. The building up of the air pressure in the chamber 62 causes the second piston 64 to move rearward until it reaches the position shown in FIGURE 1, the abutment 64a having held piston 64 away from the opposed wall of piston 40 to permit differential pressure entering chamber 62 to move piston 64. The ejector valve has now completed its cycle and is once again in the position of FIGURE 1 and can start to receive moisture from the air reservoir.

The invention has been described as working automatically upon the application of the air brake or any other device using air pressure. The moisture from the ejector valve can also be removed by means of the manual handle 70. The handle is pulled forward until the pistons reach the position of FIGURE 2, gravity then causing the moisture to flow out of the ports 60 to the atmosphere. After the handle is released, the automatic action described above moves the pistons back into the position of FIGURE 1.

While I have shown and described a preferred form of the invention, it should be understood that numerous modifications, changes, substitutions, and alternations can be made without departing from the fundamental theme of the invention. For example, the reduced chamber portion 28 might extend rearwardly in the lower part of the housing, and there might be no recessions 42 and 58 in the lower portion of the piston 40, so that there would be no space 44 to collect moisture in the lower portion of the valve. All moisture would be held in the chamber 62. Therefore I wish the invention to be unrestricted except by the following claims.

I claim:

1. In a valve, a housing, a first pressure inlet in said housing, a second pressure inlet in said housing, a first piston reciprocal in said housing in response to pressure entering said housing through said first and second inlets, said first piston having first and second areas simultaneously exposable to said first inlet, said first area being less than said second area whereby the differential resulting force component is effective to urge said first piston toward one position, said first piston having a third area exposed to said second inlet, said third area being greater than said second area whereby the force component of pressure entering said second inlet is effective to overcome said differential force component to urge said first piston toward a second position, an outlet in said housing, a first seal carried by said first piston and positioned to seal said first inlet from said outlet at said one position of said first piston, a second seal carried by said first piston in axial spaced relationship with said first seal and positioned to seal said first inlet from said outlet at said second position of said first piston, a moisture collection chamber in said first piston, a second piston reciprocal in said chamber and having a first area exposed to pressure entering said second inlet, and a second area exposed to pressure within said chamber, a port in said first piston, said port extending through the wall of said first piston and communicating with said chamber, said port being positioned between said first and second seals for communication with said first inlet at said one position of said first piston and for communication with said outlet at said second position of said first piston, said housing having a seating surface for said first and second seals, said seating surface having a length longer than the distance between said first and second seals whereby said first inlet is sealed from said outlet at all positions of said first piston.

2. A valve including a housing having a chamber therein, a first inlet in the housing communicating with said chamber, one end of said chamber being open to atmosphere, a second inlet in said housing and communicating with the opposite end of said chamber, a hollow first piston reciprocal in said chamber in response to pressure entering said housing through said inlets, a first seal sealing between said first piston and the housing in one position of said first piston, a second piston reciprocable in the hollow portion of said first piston, a second chamber formed by the hollow portion of said first piston and the second piston, a port in the first piston connecting the first chamber with the second chamber at said one position of said first piston, said second piston being movable in one direction in response to pressure entering said second inlet and movable in another direction in response to pressure entering said second chamber through said port, and a second seal sealing said first piston and the housing at a second position of said first piston, said port being positioned between said first and second seals and communicating with said open chamber end when said first piston is at said second position, said first piston having differential areas on opposite sides of said first inlet whereby said first piston is urged toward said one position and having a third area exposed to said second inlet, said third area being greater than the difference between said differential areas, said housing having a seating surface for said first and second seals, said seating surface having a length greater than the space between said first and second seals.

3. A valve including a housing having a chamber therein, a first inlet in said housing communicating with said chamber, a first piston mounted in said chamber and having differential areas exposed to pressure entering said first inlet, a second chamber within said first piston, port means placing said second chamber in communication with the first chamber at a first position of said first piston, a second piston mounted for movement in said second chamber, one end of said first chamber being open to atmosphere, a second inlet in said housing and communicating with the opposite end of said chamber, said first piston having an area greater than the difference between said differential areas exposed to said second inlet, said second piston having an area exposed to said second inlet, said port means placing said second chamber in communication with said open chamber end when said first piston is at a second position, and means sealing said first inlet against communication with said open chamber end at all positions of said first piston.

4. A valve including a housing, a chamber in said housing, one end of said chamber being open to atmosphere, a first pressure inlet in said housing and communicating with said chamber, a first piston reciprocal in said chamber, said piston having a moisture-receiving position and a moisture-ejecting position, said piston having differential areas disposed on opposite sides of said first inlet when said piston is in moisture-receiving position whereby said piston is urged toward said moisture-receiving position, a moisture-receiving chamber in said first piston, a port in said first piston communicating with said first inlet and said moisture-receiving chamber when said first piston is in moisture-receiving position whereby moisture and pressure entering said housing chamber is delivered to said moisture-receiving chamber when said piston is in moisture-receiving position, a second piston reciprocal in said moisture receiving chamber, a second inlet in said housing and communicating with the opposite end of said chamber, said second piston having a surface exposed to said second inlet and being urged toward said second inlet by pressure within said moisture-receiving chamber, said first piston having a surface exposed to said second inlet, said first piston surface being greater in area than the difference between said differential areas whereby pressure entering said second inlet is effective to move said first piston toward moisture-ejecting position, said port being formed and positioned to place said moisture-receiving chamber in communication with said open chamber end when said first piston is in moisture-ejecting position, seal means carried by said first piston and effective to seal said first inlet against communication with said open chamber end at all positions of said first piston, said second piston being movable toward said port in response to pressure entering said second inlet and the discharge of pressure through said port from said moisture-receiving chamber when said first piston is in moisture-ejecting position, said first piston having a second surface exposed to said first inlet when said first piston is in moisture-ejecting position whereby said first piston is urged toward moisture-receiving position by pressure entering said first inlet in the absence of pressure entering said second inlet.

5. A moisture-ejection valve including a housing having a chamber therein, said chamber having a reduced portion bounded at its inner end by an annular lip, a first inlet in the housing communicating with the chamber, one end of said chamber being open to atmosphere, a second inlet in the housing communicating with the opposite end of said chamber, a hollow first piston mounted for reciprocation in said chamber, a side of said first piston having a recession therein bounded at one end by an annular face, said face being formed and adapted to seat on said lip when said first piston is moved toward said open chamber end, a first sealing means between the reduced portion of the chamber and the piston sealing the port of the open chamber end when said first piston is in one position, a second piston mounted for reciprocation in the hollow portion of the first piston and having a surface exposed to said second inlet, a second chamber formed by the hollow portion of the first piston and the second piston, at least one port in the first piston communicating the first chamber with the second chamber when said first piston is in said one position, a second sealing means disposed in the piston recession and adapted to form a seal between the reduced portion of the chamber and the piston when the piston has moved toward said open chamber end, said port being positioned between said first and second sealing means and communicating said second chamber with said open chamber end when said first piston is moved toward said open chamber end, said reduced chamber portion having a length greater than the distance between said first and second sealing means.

6. The structure of claim 5 further characterized by a handle appended to said first piston for manually actuating the valve.

7. A moisture-ejection valve comprising a housing, said housing having a chamber therein, one end of said chamber being open to atmosphere, a first inlet in said housing communicating with said chamber, a second inlet in said housing communicating with said chamber, a first piston reciprocal within said chamber in response to pressure entering said chamber through said inlets, said first piston having a moisture-collection chamber therein, a second piston reciprocal within said moisture-collection chamber in response to pressure entering said chambers through said inlets, a port in said piston placing said housing chamber and moisture-collection chamber in communication one with the other when said first piston is in one position, a first seal means carried by said first piston on one side of said port and in sealing engagement with said housing at said one position of said first piston, a second seal means carried by said first piston on the opposite side of said port and in sealing engagement with said housing at a second position of said first piston, at least one of said seal means engaging said housing in sealing engagement at all positions of said first piston, said port placing said moisture-collection chamber in communication with said open housing chamber end when said first piston is in said second position, said first piston having differential areas exposable to said first inlet to urge said first piston toward said one position and having a third area greater than the difference between said differential areas exposed to said second inlet to urge said first piston toward said second position.

8. A moisture-ejection valve comprising a housing, a piston chamber in said housing, one end of said chamber being open to atmosphere, a first inlet in said housing communicating with said chamber, a second pressure inlet in said housing communicating with said chamber, a hollow piston reciprocal within said housing in response to pressure entering thereinto through said inlets, a moisture-collection chamber in said hollow piston, a port in said hollow piston communicating with said moisture-collection chamber, a second piston reciprocal within said moisture-collection chamber in response to pressures entering said chambers from said inlets, said port being positionable in communication with said first inlet at one position of said hollow piston, said port being in communication with atmosphere at a second position of said hollow piston, a first seal means carried by said hollow piston and positioned to seal said first inlet from said open end of said housing chamber at said first position of said hollow piston, and a second seal means carried by said hollow piston and positioned to seal said first inlet from said open end of said housing chamber at said second position of said hollow piston, said first and second seal means being spaced on said piston, said housing having a seal surface engageable by said first and second seal means and having a length greater than the space between said first and second seal means whereby said first inlet is sealed from said open end of said housing by at least one of said first and second seal means at all positions of said piston.

References Cited in the file of this patent
UNITED STATES PATENTS

| | | |
|---|---|---|
| 2,602,462 | Barrett | July 8, 1952 |
| 2,619,106 | Wilkerson | Nov. 25, 1952 |
| 2,845,081 | George | July 29, 1958 |